(12) United States Patent
Shimoda

(10) Patent No.: US 6,525,666 B1
(45) Date of Patent: Feb. 25, 2003

(54) POWER CIRCUIT

(75) Inventor: Sadashi Shimoda, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/465,079

(22) Filed: Dec. 16, 1999

(51) Int. Cl.[7] .............................................. G08B 21/00
(52) U.S. Cl. ........................ 340/636; 340/635; 340/7.32
(58) Field of Search ................................. 340/635, 657, 340/660, 661, 662, 663, 636, 7.32, 7.36, 7.37, 3.1; 396/228, 230, 231; 363/15, 49, 59; 323/280, 281, 283; 318/782, 805; 62/77, 127

(56) References Cited

U.S. PATENT DOCUMENTS

| | | | | |
|---|---|---|---|---|
| 5,216,349 A | * | 6/1993 | Kanouda et al. ............ | 318/805 |
| 5,596,261 A | * | 1/1997 | Suyama ...................... | 340/636 |
| 5,734,254 A | | 3/1998 | Stephens .................... | 320/106 |
| 5,802,467 A | | 9/1998 | Salazar et al. .............. | 455/420 |
| 5,898,234 A | * | 4/1999 | Kitagawa .................... | 307/48 |
| 6,025,704 A | * | 2/2000 | Elliott ........................ | 323/280 |
| 6,082,122 A | * | 7/2000 | Madenokouji et al. ......... | 62/77 |

FOREIGN PATENT DOCUMENTS

| | | |
|---|---|---|
| EP | 0632563 | 1/1995 |
| GB | 2292828 | 3/1996 |

* cited by examiner

*Primary Examiner*—Van Trieu
(74) *Attorney, Agent, or Firm*—Adams & Wilks

(57) ABSTRACT

Household appliances such as televisions require the continuous supply of power to a remote control receiving circuit and microcomputer to receive remote control signals when turned off. To reduce power consumption, charge is stored in a battery or capacitor to supply power to the microcomputer and remote control receiving circuit without continuous operation of an AC-DC converter. Before a voltage of the charge storing device is reduced below a given level, such as the lowest operating voltage of the microcomputer and remote control receiving circuit, the AC-DC converter is activated to charge the charge storing device. When the voltage rises to a given level, such as the highest operating voltage of the microcomputer and the remote control receiving circuit, the AC-DC converter stops charging the charge storing device, so that the operating frequency of the AC-DC converter is reduced.

20 Claims, 3 Drawing Sheets

POWER CIRCUIT

BACKGROUND OF THE INVENTION

The present invention relates to a power circuit for domestic electrical appliances having a remote control function, and more particularly to a power circuit which reduces a current consumed in the household electrical appliances during a waiting period of time.

As a conventional power circuit for household or domestic electrical appliances having a remote control function, there has been known a power circuit using means for converting an a.c. voltage into a d.c. voltage (hereinafter referred to as "AC-DC converter") as shown in a circuit diagram of FIG. 3. That is, an output voltage of the AC-DC converter 101 permits a control circuit for remote control, in this example, a microcomputer and an infrared ray receiving circuit, 103 for producing an output signal 110 in response to an infrared signal 115 received from an external controller to be driven.

SUMMARY OF THE INVENTION

In the circuit of FIG. 3, in a domestic electrical appliance such as a television, power must be continuously applied to the infrared ray receiving circuit and the microcomputer because the electrical appliance receives a remote control signal even if an image reception turns off. This is called "waiting-time consumed power". However, the efficiency of the AC-DC converter is low, and a power of about 1 W is consumed only for such a waiting-time consumed power. Under existing environmental issues, a demand has been made to reduce the consumed power at the waiting time as much as possible, which cannot be achieved by the existing circuit structure at all.

In order to solve the above problem, electricity is stored in electric charge storing means such as a secondary battery or an electric double layer capacitor so as to supply power to the microcomputer and the infrared ray receiving circuit without always operating the AC-DC converter. Before a voltage across the electric charge storing means becomes lower than a given value, specifically, the lowest operating voltage of the microcomputer and the infrared ray receiving circuit, the AC-DC converter is operated to charge the electric charge storing means whereas before the voltage rises to and the given voltage, specifically, the highest operating voltage of the microcomputer and the infrared ray receiving circuit, the AC-DC converter stops charging the electric charge storing means. With the above operation, the operating frequency of the AC-DC converter is reduced so that the power consumed by the AC-DC converter which is the worst in power efficiency is reduced, thereby making it possible to reduce the entire waiting-time consumed power.

DESCRIPTION OF THE PREFERRED EMBODIMENTS

The present invention is directed to a structure in which a connection is made such that power is supplied from electric charge storing means to an infrared ray receiving circuit and a microcomputer, a fluctuation of voltage across the electric charge storing means is detected by voltage detecting means, and an output signal from the voltage detecting means allows an AC-DC converter to operate.

Figure 1:
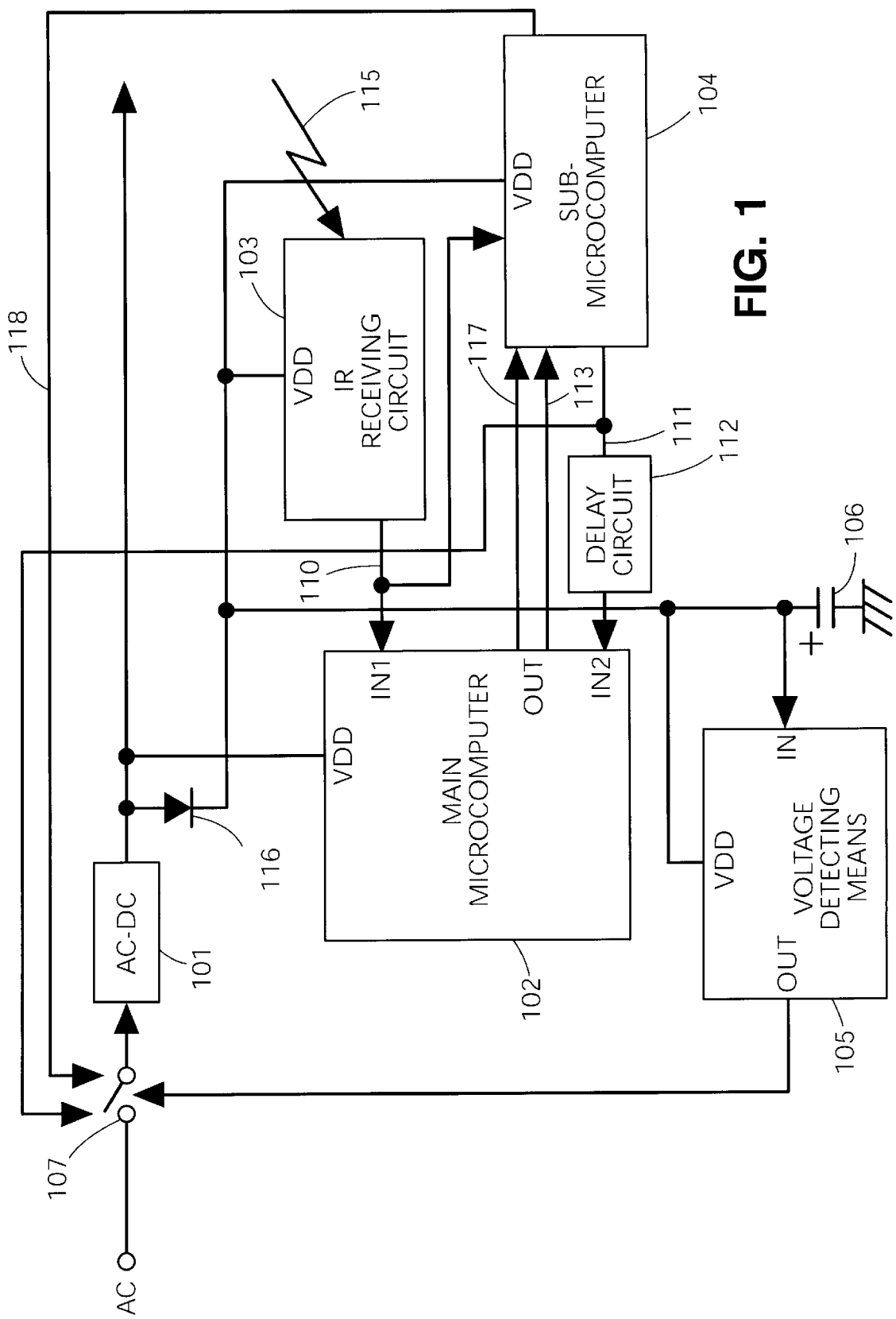
FIG. 1 is an explanatory diagram showing a power circuit in accordance with Embodiment 1 of the present invention.

FIG. 1 is a diagram showing a power circuit in accordance with Embodiment I of the present invention. An AC input is connected with an AC-DC converter 101 through a switch 107, and an output of the AC-DC converter 101 is supplied to a positive power supply of a main microcomputer 102. The output of the AC-DC converter 101 is also supplied through a diode 116 to a sub-microcomputer 104, an infrared ray receiving circuit 103 and a positive power supply of electric charge storing means 106. The positive power supply is monitored in voltage by voltage detecting means 105 and an output of the voltage detecting means 105 is used for an open/close signal of the switch 107. The infrared ray receiving circuit 103 receives an infrared ray signal 115 from the external to output an output 110, and the output signal is inputted to the main microcomputer 102 and the sub-microcomputer 104. A signal 111 from the sub-microcomputer 104 is used to close the switch 107. The signal 111 is also inputted to the main microcomputer 102 through a delay circuit 112. Output signals 113 and 117 of the main microcomputer 102 are inputted to the sub-microcomputer 104. Also, a signal 118 used for opening the switch 107 is outputted from the sub-microcomputer 104.

Subsequently, the operation of the circuit shown in FIG. 1 will be described. When the AC-DC converter 101 suspends in a state where the switch 107 is opened, the main microcomputer 102 suspends because a power is not supplied to the main microcomputer 102. If the electric charge storing means 106 is lower than a given voltage, the voltage detecting means 105 outputs a signal which allows the switch 107 to be closed. As a result, the AC-DC converter 101 operates to charge the electric charge storing means 106. At the same time, since the power is also supplied to the infrared ray receiving circuit 103 and the sub-microcomputer 104, those circuits are operational. Thereafter, when the electric charge storing Weans 106 is charged up to the given voltage, the output of the voltage detecting means 105 is inverted to open the switch 107, to thereby stop the AD-DC converter. However, in this situation, since the power is supplied to the infrared ray receiving circuit 103 and the sub-microcomputer 104 from the electric charge storing means 106, the infrared ray receiving circuit 103 and the sub-microcomputer 104 continue to operate.

Now, when an infrared ray signal 115 corresponding to a command code representative of power on is input to the infrared ray receiving circuit 103 from a remote controller, the infrared ray receiving circuit 103 outputs the signal 110 to the sub-microcomputer 104. Because the sub-microcomputer 104 is operational, the signal 111 is output to the switch 107 to make the switch 107 close. In this situation, the AC-DC converter 101 starts to operate. A voltage developed by the AC-DC converter 101 brings the main microcomputer 102 to a state where it can start to operate. Actually, a signal resulting from delaying the signal 111 by the delay circuit 112 makes the main microcomputer 102 start to operate. Actually, a signal resulting from delaying the signal 111 by the delay circuit 112 makes the main microcomputer 102 start to operate. The delay circuit is used to cancel the reset of the main microcomputer 102, after the AC-DC converter 101 is started and its output voltage sufficiently rises. In addition, the main microcomputer 102 may output the signal 117 to the sub-microcomputer 104 after starting so as to stop the operation of the sub-microcomputer 104 for the purpose of reducing the consumed current of the sub-microcomputer. In this event, because there is found such a fact that the main microcomputer 102 normally starts to operate, the power circuit is improved in reliability. However, in the case where the consumed current of the sub-microcomputer 104 is so small that it can be ignored, the sub-microcomputer 104 may not forcedly be suspended. After the main microcomputer 102 starts operation, the infrared ray signal 115 is amplified and filtered by the infrared ray receiving circuit 103, and then processed by the main microcomputer 102 as the signal 110.

Subsequently, when the infrared ray signal 115 corresponding to a command code representative of power off is input to the infrared ray receiving circuit 103 from the remote controller, the infrared ray receiving circuit 103 outputs the signal 110 to the main microcomputer 102. The main microcomputer 102 outputs the signal 113 to the sub-microcomputer 104 to start the operation of the sub-microcomputer 104. After the sub-microcomputer 104 normally starts its operation, the sub-microcomputer 104 sends out the signal 118 to the switch 107, to thereby open the switch 107. In this method, because of the fact that the sub-microcomputer 104 normally starts to operate, the power circuit is improved in reliability. Then, because the AC-DC converter 101 suspends so that the power supply to the main microcomputer 102 is interrupted, the operation of the main microcomputer 102 also suspends with the result that the consumed power is reduced. The charges in the electric charge storing means 106 do not inversely flow to the main microcomputer 102 because of the diode 116.

According to the present invention, because the power is always supplied to the infrared ray receiving circuit 103 and the sub-microcomputer 104 from the electric charge storing means 106, the infrared ray signal 115 can always receive remote commands even in a state where the AC-DC converter 101 does not operate. In this state, because only the infrared ray receiving circuit 103, the sub-microcomputer 104 and the voltage detecting means 105 operate, the entire consumed current can be reduced. Because the main microcomputer 102 is normally operated with clocks of about 10 MHz, a current of about 50 mA is required. However, if the structure is made so that only the sub-microcomputer 104 operates, the consumed current can be reduced to about 100 $\mu$A. Also, a total consumed current of the infrared ray receiving circuit and the voltage detecting means 105 is also reduced to about 100 $\mu$A.

Also, the AC-DC converter 101 is operated only when the voltage across the electric charge storing means becomes lower than the given voltage. The intermittent operation of the AC-DC converter 101 makes it possible to further reduce the consumed power in the AC-DC converter 101. In this example, the above given voltage at which the AC-DC converter 101 operates is detected by the voltage detecting means 105, and the given voltage is a voltage close to the lowest operating voltage of the infrared ray receiving circuit 103 or the sub-microcomputer 104. On the other hand, in the case where the AC-DC converter 101 stops the operation after that, if the voltage across the electric charge storing means 106 rises due to charging and comes to a voltage close to the highest operating voltage of the infrared ray receiving circuit 103 or the sub-microcomputer 104, the given voltage is detected by inverting the output of the voltage detecting means 105. In other words, the detection of the given voltage is realized by providing the voltage detecting means 105 with hysteresis. Also the voltage detection may be conducted by the sub-microcomputer if the sub-microcomputer 104 has an A/D converter.

According to the present invention, the switch is used as means for stopping the operation of the AC-DC converter. Alternatively, the AC-DC converter per se may be provided with an on/oft function to realize the operation start/suspension of the AC/DC converter.

Also, the circuit pertaining to the infrared ray reception according to the present invention is generally supplied as a so-called module which results from mounting an IC circuit on a printed circuit board in a package state or in a bear chip state. This is called an "infrared ray receiving module". The power circuit of the present invention is also applicable to the infrared ray receiving module. In other words, the control means, the infrared ray receiving means, the control means such as a sub-microcomputer or the main microcomputer, the voltage detecting means and the electric charge storing means are disposed on the same printed board, thereby making it possible to manufacture an infrared ray receiving module small in space. It is desirable that the A respective means are disposed on the printed board if necessary because of the arrangement of other circuits.

Figure 2:
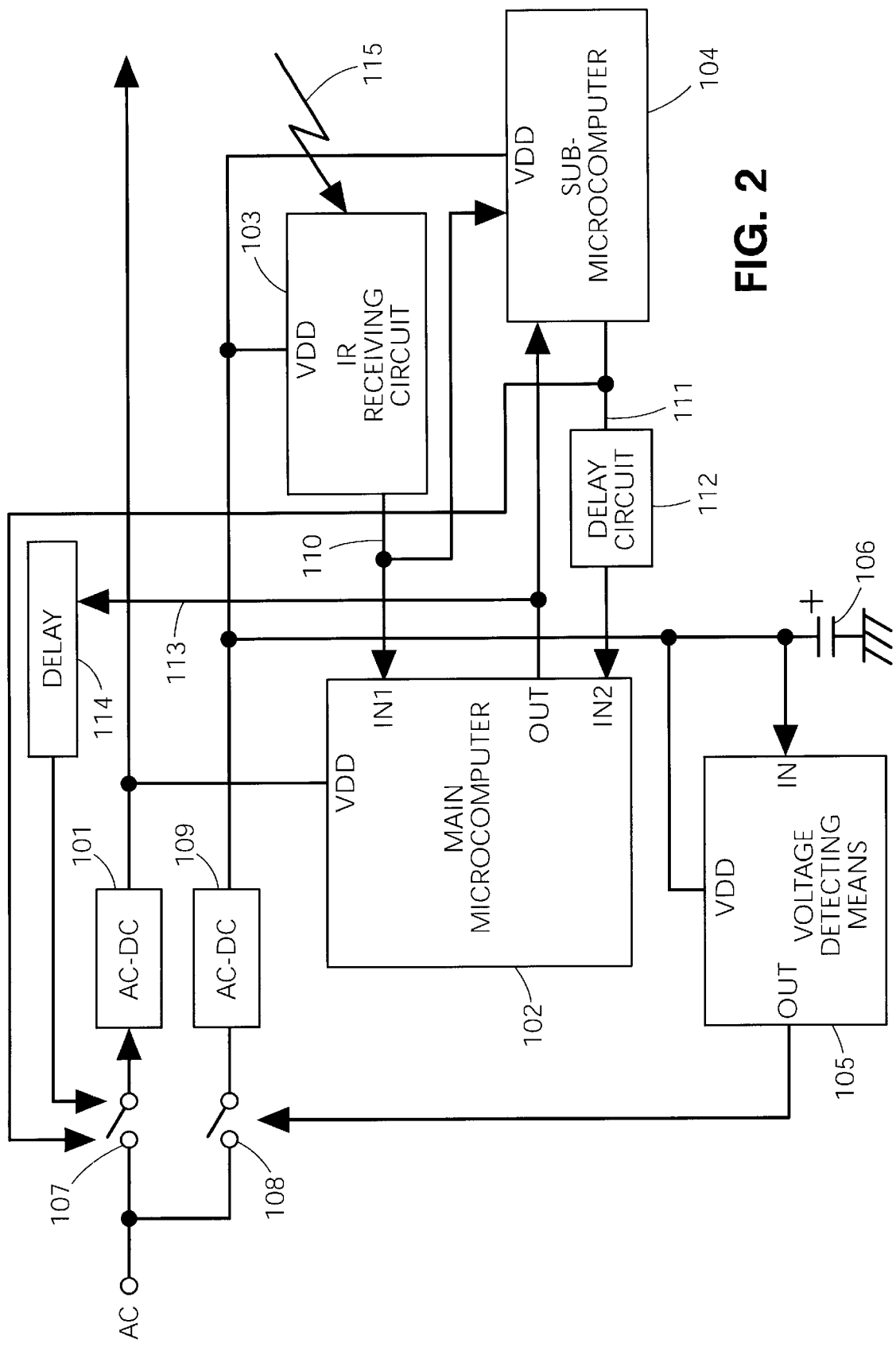
FIG. 2 is an explanatory diagram showing a power circuit in accordance with Embodiment 2 of the present invention.
Figure 3:
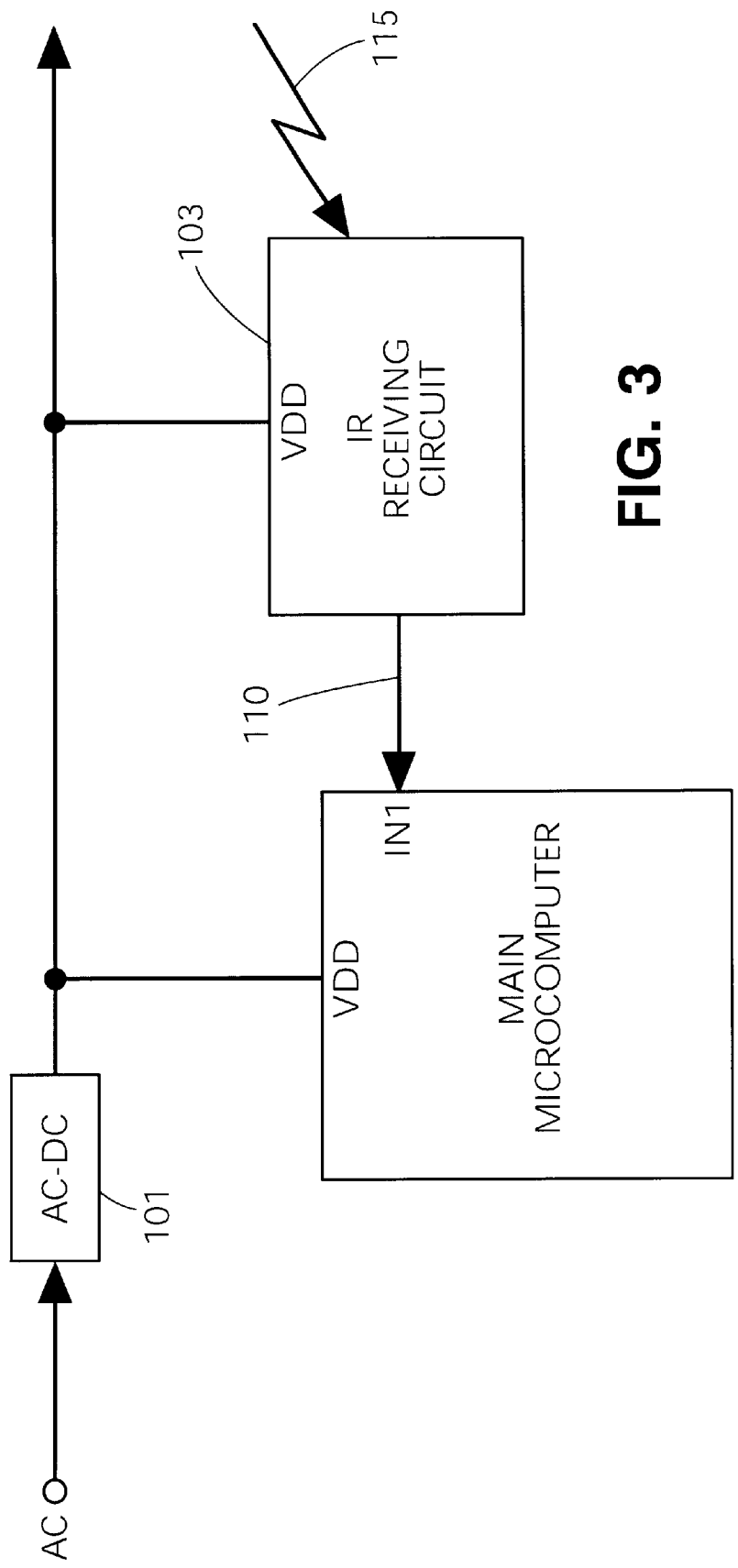
FIG. 3 is an explanatory diagram showing a conventional power circuit.

FIG. 2 is a diagram showing a power circuit in accordance with Embodiment 2 of the present invention. An AC input is connected with a first AC-DC converter 101 through a switch 107, and an output of the AC-DC converter 101 is if supplied to a positive power supply of a main microcomputer 102. The AC input is also connected with a second AC-DC converter 109 through a switch 108, and an output of the AC-DC converter 109 is supplied to a sub-microcomputer 104, an infrared ray receiving circuit 103 and a positive power supply of electric charge storing means 106. The electric charge storing means 106 is monitored by voltage detecting means 105, and an output of the voltage detecting means 105 is used as an open/close signal of the switch 108. The infrared ray receiving circuit 103 receives an external to output an output 110, and the output signal is input to the main microcomputer 102 and the sub-microcomputer 104. A signal 111 is output from the sub-microcomputer 104 to close the switch 107. The signal 111 is also input to the main microcomputer 102 through a delay circuit 112. An output signal 113 of the main microcomputer 102 is input to the sub-microcomputer 104 and also used for opening the switch 107 through a delay circuit 114.

Subsequently, the operation of the circuit shown in FIG. 2 will be described. When the AC-DC converter 101 suspends in a state where the switch 107 is opened, the main microcomputer 102 suspends because [a] power is not supplied to the main microcomputer 102. If the electric charge storing means 106 is lower than a given voltage, the voltage detecting means 105 outputs a signal which allows the switch 108 is be closed. As a result, the AC-DC converter 109 operates to charge the electric charge storing means 106. At the same time, since the power is also supplied to the infrared ray receiving circuit 103 and the sub-microcomputer 104, those circuits are operational. Thereafter, when the electric charge storing means is charged up to the given voltage, the output of the voltage detecting means 105 is inverted to open the switch 108, to thereby stop the AD-DC converter. However, in this situation, since the power is supplied to the infrared ray receiving circuit 103 and the sub-microcomputer 104 from the electric charge storing means 106, the infrared ray receiving circuit 103 and the sub-microcomputer 104 continue to operate.

Now, when an infrared ray signal 115 corresponding to a common code representative of power on is input to the infrared ray receiving circuit 103 from a remote controller, the infrared ray receiving circuit 103 outputs the signal 110 to the sub-microcomputer 104. Because the sub-microcomputer 104 is operational, the signal 111 is output to the switch 107 to make the switch 107 close. In this situation, the AC-DC converter 101 starts to operate. A voltage developed by the AC-DC converter 101 brings the main microcomputer 102 to a state where it can start to operate. Actually, a signal resulting from delaying the signal 111 by the delay circuit 112 makes the main microcomputer 102 start to operate. A control program may be designed in such a manner that the sub microcomputer 104 stops operation after it outputs the signal 111, to thereby reduce the consumed power. After the main microcomputer 102 starts operating, the infrared ray signal is amplified and filtered by the infrared ray receiving circuit 103, and then processed by the main microcomputer 102 the signal 110. Subsequently, when the infrared ray signal 115 corresponding to a command code representative of power off is input to the infrared ray receiving circuit 103 from the remote controller, the infrared ray receiving circuit 103 from the remote controller, the infrared ray receiving circuit 103 outputs the signal 110 to the main microcomputer 102. The main microcomputer 102 outputs the signal 113 to the sub-microcomputer 104 to start the operation of the sub-microcomputer 104. At the same time, the signal 113 is delayed by the delay circuit 114 and is used to open the switch 107. As a result, because the AC-DC converter 101 suspends so that the power supply to the main microcomputer 102 is interrupted, the operation of the main microcomputer 102 also suspends to reduce the consumed power.

According to the present invention, because the power is always supplied to the infrared ray receiving circuit 103 and the sub-microcomputer 104 from the electric charge storing means 106, the infrared ray signal 115 can always be received even in a state where the AC-DC converters 101 and 109 do not operate. In this state, because only the infrared ray receiving circuit 103, the sub-microcomputer 104 and the voltage detecting means 105 operate, the entire consumed current can be reduced. Because the main microcomputer 102 is normally operated with clocks of about 10 MHz, a current of about 50 mA is required. However, if the structure is made so that only the sub-microcomputer 104 operates, the consumed current can be reduced to about 100 μA. Also, a total consumed current of the infrared ray receiving circuit and the voltage detecting means 105 is also reduced to about 100 μA. The reason why the AC-DC converter is divided into converters 101 and 109 is that although the load current of the AC-DC converter 101 is on the order of several tens of A because it is used to operate the main circuit, the load current of the AC-DC converter 109 is the order of several hundreds of mA which is low in load because it is used to operate only the infrared ray receiving circuit 103, the sub-microcomputer 104 and the voltage detecting means 105. Accordingly, because those AC-DC converters 101 and 109 are greatly different in the order of load current from each other, if they are structured by one AC-DC converter, the efficiency at a low load is deteriorated. As a result, not only the consumed current of the infrared ray receiving circuit 103, the sub-microcomputer 104 and the voltage detecting means 105 but also the consumed current of the AC-DC converter dominates, resulting in a factor that prevents the reduction of consumed current. For the above reason, this embodiment employs two AC-DC converters.

Also, the AC-DC converter 109 is operated only when the voltage across the electric charge storing means becomes lower than the given voltage. The intermittent operation of the AC-DC converter 109 makes it possible to further reduce the consumed power in the AC-DC converter 109. In this example, the above given voltage at which the AC-DC converter 109 operates is detected by the voltage detecting means 105, and the given voltage is a voltage close to the lowest operating voltage of the infrared ray receiving circuit 103 or the sub-microcomputer 104. On the other hand, in the case where the AC-DC converter 109 stops the operation after that, if the voltage across the electric charge storing means rises due to charging and comes to a voltage close to the highest operating voltage of the infrared ray receiving circuit or the sub-microcomputer, the given voltage is detected by inverting the output of the voltage detecting means 105. In other words, the detection of the given voltage is realized by providing the voltage detecting means 105 with hysteresis. Also, the voltage detection may be conducted by the sub-microcomputer if the sub-microcomputer 104 has an A/D converter.

According to the present invention, the switch is used as means for suspending the operation of the AC-DC converter. Alternatively, the AC-DC converter per se may be provided with an on/off function to realize the operation start/suspension of the AC/DC converter.

The present invention has the following advantages. That is, electricity is stored in electric charge storing means such as a secondary battery or an electric double layer capacitor so as to supply power to the microcomputer and the infrared ray receiving circuit without always operating the AC-DC converter. With the above operation, the operating frequency of the AC-DC converter is reduced so that the power consumed by the AC-DC converter which is the worst in power efficiency is reduced, thereby making it possible to reduce the entire waiting-time consumed power. Also, if the power circuit of the present invention is also applicable to the infrared ray receiving module, the control means, the infrared ray receiving means, the control means such as a sub-microcomputer and the main microcomputer, the voltage detecting means and the electric charge storing means are disposed on the same printed circuit board, thereby making it possible to manufacture the infrared ray receiving module small in space.

What is claimed is:

1. A power supply circuit for an electrical apparatus having an internal circuit with a remote control function, the power supply circuit comprising: a converter for converting an a.c. voltage into a d.c. voltage and driving the internal circuit; a charge storage device for storing a charge produced by the converter; a voltage detector driven by the charge storage device for detecting a voltage of the charge storage device; a remote control signal receiver driven by the charge storage device for receiving a remote control signal from an external controller and producing a corresponding output signal; and a controller having a sub-microcomputer driven by the charge storage device and a main microcomputer driven by the converter, the sub-microcomputer for receiving the output signal of the remote control signal receiver and outputting a signal for activating the converter so that the converter drives the internal circuit.

2. A power supply circuit according to claim 1; wherein the controller, the remote control signal receiver, the charge storage device and the voltage detector are disposed on the same printed circuit board.

3. A power supply circuit according to claim 1; wherein the voltage detector outputs a signal to activate the converter to charge the charge storage device when the detected voltage of the charge storage device falls below a first predetermined level and outputs a signal to deactivate the converter when the detected voltage is above a second predetermined level.

4. A power supply circuit according to claim 3; wherein the first predetermined level is lower than the second predetermined level.

5. A power supply circuit according to claim 3; wherein the first and second predetermined levels are equal.

6. A power supply circuit according to claim 1; wherein the voltage detector outputs a signal to activate the converter to charge the charge storage device when the detected voltage of the charge storage device falls below the lower one of the minimum operating voltages of the remote control signal receiver and the sub-microcomputer and to deactivate the converter when the detected voltage is above the higher one of the minimum operating voltages of the remote control signal receiver and the sub-microcomputer.

7. A power supply circuit according to claim 1; wherein the remote control signal is a signal for turning on the internal circuit.

8. A power supply circuit for an electrical apparatus having an internal circuit with a remote control function, the power supply circuit comprising: a charge storage device for storing a charge; a voltage detector for detecting a voltage across the charge storage device; a converter for converting an a.c. voltage into a d.c. voltage for driving the internal circuit, charging the charge storage device if the detected voltage across the charge storage device becomes lower than a given voltage, and stopping the charging operation of the charge storage device if the voltage becomes equal to or more than the given voltage; a remote control signal receiver driven by the charge storage device for receiving a remote control signal and producing a corresponding output signal; and a controller having a sub-microcomputer driven by the charge storage device and a main microcomputer driven by the converter, the sub-microcomputer for receiving the output signal of the remote control signal receiver and outputting a signal for activating the converter so that the converter drives the internal circuit and the main microcomputer is supplied power by the converter and turns on.

9. A power supply circuit for an electrical apparatus having an internal circuit with a remote control function, the power supply circuit comprising: a converter for converting an a.c. voltage into a d.c. voltage and driving the internal circuit; a charge storage device for storing a charge; a voltage detector for detecting a voltage of the charge storage device; a controller for controlling an on/off state of the internal circuit; and a remote control signal receiver for receiving a remote control signal from an external controller and outputting a corresponding signal to the controller to control the internal circuit; wherein the controller has a sub-microcomputer driven by the charge storage device and a main microcomputer driven by the converter, the sub-microcomputer for receiving the output signal of the remote control signal receiver and outputting a signal for activating the converter so that the converter drives the internal circuit and the main microcomputer is supplied power by the converter and turns on, and the voltage detector and the remote control signal receiver are supplied with a supply voltage from the charge storage device and the internal circuit is supplied with a supply voltage from the converter and the converter is activated only when a remote control signal for activating the internal circuit has been received by the remote control signal receiver.

10. A power supply circuit according to claim 9; wherein the main microcomputer is disposed separately from the sub-microcomputer, and the sub-microcomputer is responsive to a signal from the remote control signal receiver to activate the main microcomputer.

11. A power circuit according to claim 9; wherein the converter comprises a first converter for converting an a.c. voltage into a first d.c. voltage for driving the main microcomputer and the internal circuit and a second converter for converting the a.c. voltage into a second d.c. voltage to charge the charge storage device.

12. A power supply circuit for an electrical apparatus having an internal circuit with a remote control function, the power supply circuit comprising: a remote control signal receiver for receiving a remote control signal from an external controller; a converter for converting an a.c. voltage into a d.c. voltage and driving the internal circuit; a charge storage device for storing a charge produced by the converter; a main microcomputer driven by the controller for controlling the internal circuit; and a sub-microcomputer driven by the charge storage device for receiving an output signal of the remote control signal receiver and starting operation of the converter to drive the main microcomputer and the internal circuit in response thereto; wherein the main microcomputer stops operation of the sub-microcomputer when the remote control signal receiver receives a first signal for activating the converter, and starts the operation of the sub-microcomputer and thereafter stops the operation of the main microcomputer when the remote control signal receiver receives a second remote control signal which allows the converter to stop operating.

13. A power supply circuit for an electrical apparatus having an internal circuit with a remote control function, comprising: a power source for driving the internal circuit; a charge storage device for storing a charge produced by the power source; a remote control circuit driven by the charge storage device for receiving a remote control signal for activating the internal circuit from an external controller and outputting a corresponding signal for activating the power source to drive the internal circuit and a controller having a sub-microcomputer driven by the charge storage device and a main microcomputer driven by the power source, the sub-microcomputer for receiving the output signal of the remote control circuit and outputting a signal for activating the power source so that the power source drives the internal circuit.

14. A power supply circuit according to claim 13; wherein the power source comprises a converter for converting an a.c. signal from an a.c. power source into a d.c. signal to drive the internal circuit.

15. A power supply circuit according to claim 14; wherein the power source further comprises a switch having an on/off state disposed between the a.c. power source and the converter, the on/off state of the switch being controlled by an output signal of the remote control circuit.

16. A power supply circuit according to claim 13; wherein the charge storage device comprises one of a battery and a capacitor.

17. A power supply circuit according to claim 13; further comprising a voltage detecting circuit driven by the charge storage device for detecting a voltage of the charge storage device and outputting a corresponding signal for activating the power source when the detected voltage falls below a first predetermined level and for deactivating the power source when the detected voltage rises above a second predetermined level.

18. A power supply circuit according to claim 17; wherein the voltage detecting circuit outputs a signal to activate the power source to charge the charge storage device when the detected voltage of the charge storage device below the lower one of the minimum operating voltages of the remote control circuit and the sub-microcomputer and to deactivate the power source when the detected voltage is above the higher one of the minimum operating voltages of the remote control circuit and the sub-microcomputer.

19. A power supply circuit according to claim 17; wherein the first predetermined level is lower than the second predetermined level.

20. A power supply circuit according to claim 17; wherein the first and second predetermined levels are equal.

* * * * *